Jan. 31, 1967  R. E. BEINKE  3,301,008
CENTERING MEANS FOR A UNIVERSAL JOINT
Filed Dec. 15, 1964  2 Sheets-Sheet 1
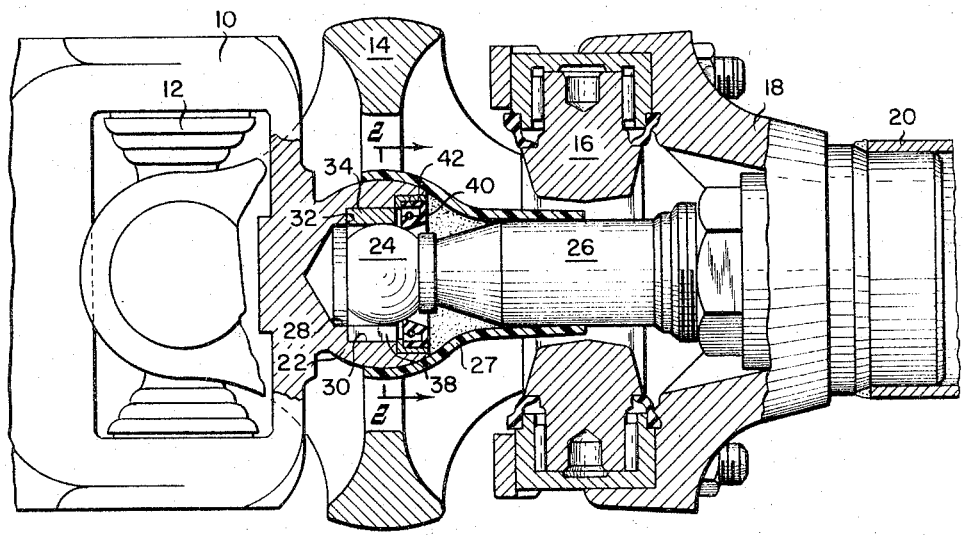
*Fig. 1*
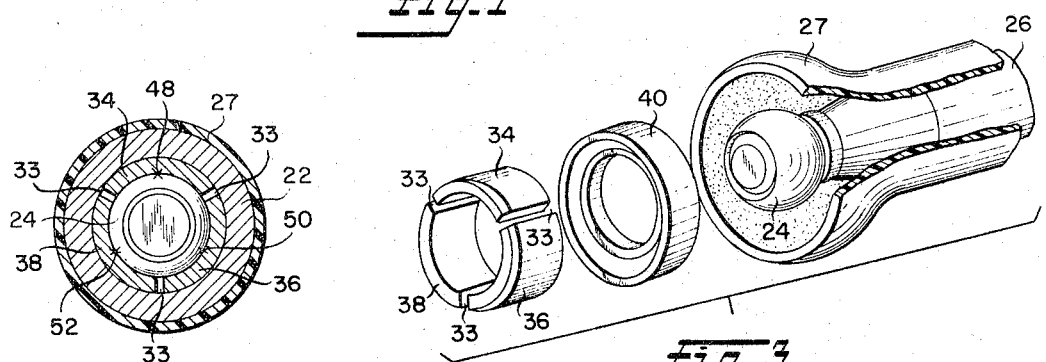
*Fig. 2*  *Fig. 3*
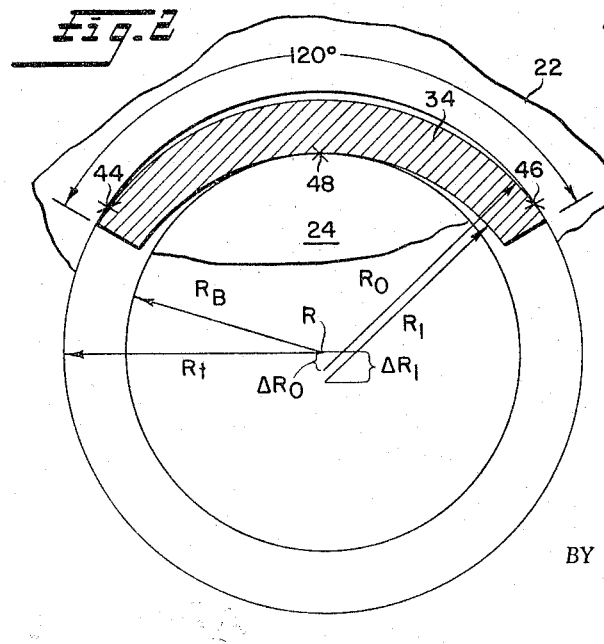
*Fig. 4*
INVENTOR
*Randall E. Beinke*
BY *Charles R. Engle*
ATTORNEY Jan. 31, 1967 R. E. BEINKE 3,301,008
CENTERING MEANS FOR A UNIVERSAL JOINT
Filed Dec. 15, 1964 2 Sheets-Sheet 2

INVENTOR.
Randall E. Beinke
BY Charles R. Engle
ATTORNEY

United States Patent Office 3,301,008
Patented Jan. 31, 1967

3,301,008
CENTERING MEANS FOR A UNIVERSAL JOINT
Randall E. Beinke, Warren, Mich., assignor to General Motors Corporation, Detroit, Mich., a corporation of Delaware
Filed Dec. 15, 1964, Ser. No. 418,411
8 Claims. (Cl. 64—17)

This invention relates to a universal joint and more particularly to a universal joint provided with centering and wear compensating means.

The advent of the low profile motor vehicle compels designing of a power shaft in one or more segments to remove as much as possible the objectionable tunnel within the vehicle floor. A double Cardan type of constant velocity universal joint is a well known coupling means for adjacent segments of the power shaft.

One of the main problems of the double Cardan type of constant velocity universal joint lies in the centering means. Since the centering means are subjected to high radial or lateral forces, any clearances within the centering means due to either manufacturing tolerances or wear will cause vibration, noise and deformation of the mating parts due to chucking.

The device in which the present invention is embodied comprises a plurality of centering shoes within the centering means which resiliently take up any clearances due to either manufacturing tolerances or wear.

Accordingly, an object of the present invention is to provide a universal joint with centering means which eliminates objectionable vibration, noise and chucking.

Another object is to provide a universal joint with centering means which eliminates clearances and tolerances in the construction thereof.

Another object is to provide a universal joint with centering means which maintains a zero clearance alignment as wear occurs in the centering means.

Other objects and features of the invention will become apparent from the following description and drawings, in which:

FIGURE 1 is an elevational view of a double Cardan type universal joint with parts broken away and in section to illustrate an embodiment of the present invention.

FIGURE 2 is a cross section of the centering means taken on line 2—2 of FIGURE 1 looking in the direction of the arrows.

FIGURE 3 is an exploded isometric view of the centering means.

FIGURE 4 is a diagrammatic view showing the dimensions of the centering shoes shown in cross section in FIGURE 2 and in exploded isometric in FIGURE 3.

Figure 5:
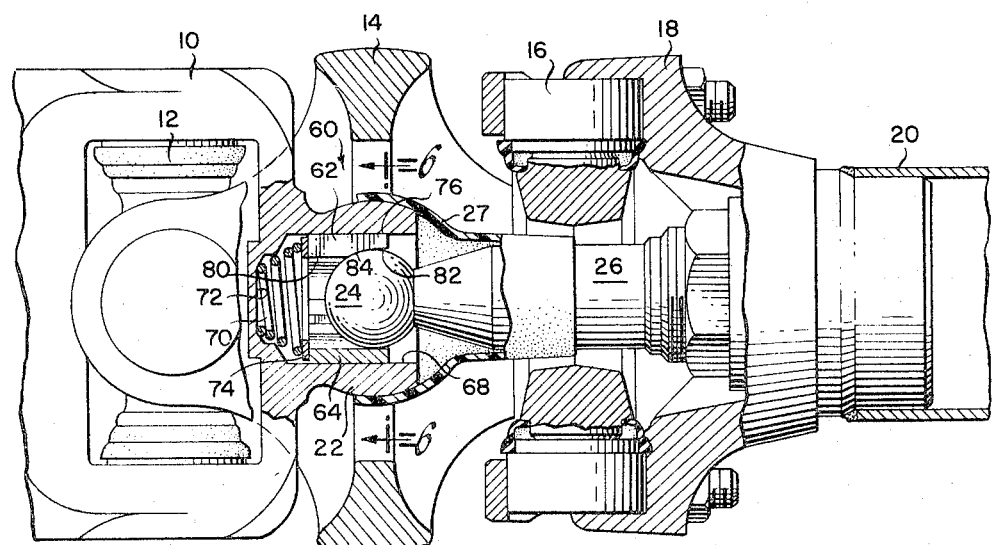
FIGURE 5 is an elevational view of a double Cardan type universal joint with parts broken away and in section to illustrate another embodiment of the present invention.

Referring now more particularly to FIGURE 1, there is shown a double Cardan type universal joint having a drive shaft (not shown) connected to a yoke member 10. A conventional spider 12 is mounted to yoke member 10 for rotation about a first axis while a connecting member 14 is fastened to the spider 12 for rotation about a second traverse axis. The opposite end of the connecting member 14 is fastened to a second conventional spider 16 which is secured to a second yoke 18 carried by shaft 20. Torque is thus transmitted from the drive shaft (not shown) to shaft 20 or vice-versa through yoke 10, spider 12, connecting member 14, spider 16, and yoke 18 as has been common practice in this art.

Extending axially from yoke 10 is an integral, somewhat spherical tubular member 22. The tubular member 22 surrounds a spherical ball 24 which is on the end of a stud 26 extending from the second yoke 18. A protective plastic covering 27 extends between the tubular member 22 and the stud 26. Bore 28 in tubular member 22 has an intermediate portion 30 of increased diameter thus forming an inner shoulder 32. Disposed in the intermediate portion 30 and abutting the shoulder 32 are three circumferentially spaced centering shoes 34, 36 and 38 as best shown in FIGURE 3. The inner surface of each centering shoe contacts spherical ball 24. A conventional seal 40 is provided between an outer portion 42 of further increased diameter of the bore 28 in tubular member 22 and the spherical ball 24.

As best can be seen from FIGURES 2 and 3, the centering shoes 34, 36 and 38 are segments of approximately 120° of a right cylindrical tube. Of course, due to the spaces 33 provided between adjacent shoes, the segments will be somewhat less than 120°. Referring now to FIGURE 4, there is shown centering shoe 34 with its relationship to the spherical ball 24 and to portion 30 of bore 28 exaggerated for purposes of illustration. Shoe 34 is typical of the condition of all the shoes 34, 36 and 38 so that description of it alone will be sufficient. $R_t$ represents the radius of the portion 30 of bore 28 of the tubular member 22 and $R_B$ represents the radius of spherical ball 24. In the desired centered condition, the centers of the spherical ball 24 and bore 28 of the tubular member 22 will be coincident as shown at R. $R_O$ is the outer radius of centering shoe 34 and is greater than $R_t$ by an amount $\Delta R_o$. $R_i$ is the inner radius of centering shoe 34 and is greater than $R_B$ by an amount $\Delta R_1$.

The difference $\Delta R_o$ between the radius of curvature $R_o$ of the outer surface of centering shoe and the radius of curvature $R_T$ of the bore portion 30 is a function of the relative diameters of the bore portion 30 and the spherical ball 24. Once this difference $\Delta R_o$ or interference fit has been established, I have found that the difference $\Delta R_1$ or interference fit between the inner surface of the centering shoe 34 and the spherical ball 24 must be between a minimum of 110% and a maximum of 150% of that difference. When the centering means is assembled, each centering shoe will be distorted to a degree with the outer surface in tension and the inner surface in compression. This is due to sandwiching the arcuate centering shoe 34 into an arcuate space of different curvature. The net result is that the outer surface of centering shoe 34 contacts bore portion 30 at two points 44 and 46 near its outer edges, while the inner surface contacts spherical ball 24 at a single point 48 near its center. Due to the stressed condition of the centering shoe, the point 48 is constantly, resiliently urged radially inwardly. Thus, the three shoes 34, 36 and 38 provide three contact points 48, 50 and 52 for the spherical ball 24 all of which are constantly being resiliently urged radially inwardly. This provides a centering means which can both compensate for manufacturing tolerances and wear.

Figure 6:
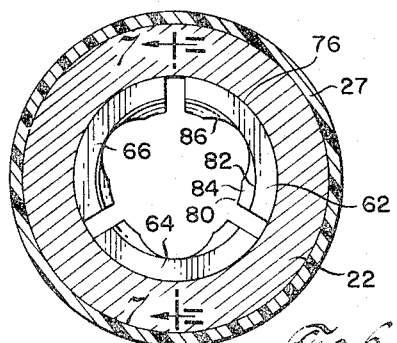
FIGURE 6 is a cross section of the centering means taken on the line 6—6 of FIGURE 5 looking in the direction of the arrows.
Figure 7:
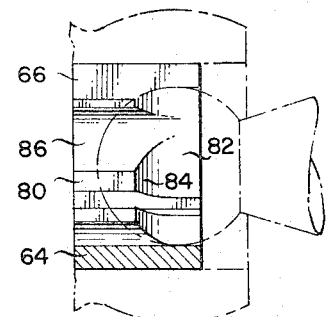
FIGURE 7 is a cross section of the centering shoes taken on the line 7—7 of FIGURE 6 looking in the direction of the arrows.
Figure 8:
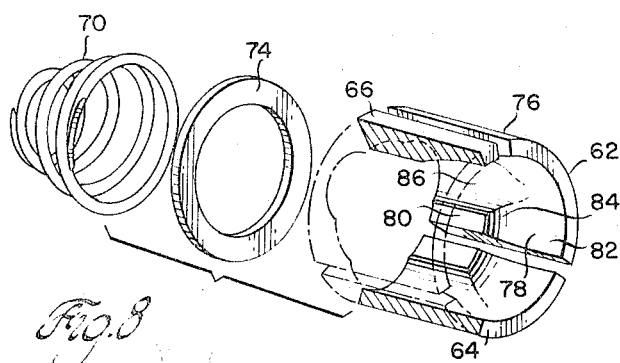
FIGURE 8 is an exploded partial isometric view of the centering means shown in FIGURE 5.

Referring now to FIGURE 5, there is also shown a double Cardan type universal joint. Many of the parts are identical to those shown in FIGURE 1, and reference numerals to those parts are identical. The difference in this structure lies in the centering means indicated generally at 60. Three centering shoes 62, 64 and 66 are disposed in bore 68 to seat spherical ball 24. In addition, a coil spring 70 is disposed in bore 68 with one end abutting end wall 72 of bore 68 and the other end abutting washer 74 adjacent the inner edges of the centering shoes 62, 64 and 66. The coil spring 70 thus urges the centering shoes 62, 64 and 66 axially, outwardly toward spherical ball 24. Since each centering shoe is identical, a description of shoe 62 will suffice. The shoe is approximately a 120° segment of a right cylindrical tubular member as best seen in FIGURES 6 and 8. The outer surface 76 is of uniform radius and has the same relationship to the radius of bore 68 as previously described in connection with FIGURE 4. The inner surface 78 comprises a first surface 80 of smaller radius and a second surface 82 of larger radius with a partispherical surface 84 contiguous with and between the first surface 80 and the second surface 82. In addition, a fourth surface 86 is formed by an axial bore tangent to the second surface 82 and cutting through the partispherical surface 84 and the first surface 80. The object of the axial bore creating the fourth surface 86 is to reduce the surface area of partispherical surface 84 so that its wear characteristics more closely match those of the second surface 82 which is in bearing contact with spherical ball 24. The radius of the second surface 82 is in the same relationship to the radius of the spherical ball as was the inner surface of centering shoe 34 described in connection with FIGURE 4. The shoes 62, 64 and 66 are urged axially outwardly by spring 70 toward ball 24 and include partispherical seating portions 84 for the ball 24 in addition to providing wear and manufacture tolerances take-up as in the previous shoes 34, 36 and 38. The forward portions of the shoes 62, 64 and 66 have an outer surface 76 with a radius of curvature greater than bore 68 and an inner surface 82 with a radius of curvature greater than spherical ball 24. The relationship between the forward portions of the shoes 62, 64 and 66 and the bore 68 and spherical ball 24 are identical to those between shoes 34 and bore 30 and spherical ball 24 as previously described in connection with FIGURE 4.

What is claimed is:

1. Centering means for a universal joint comprising a stud which terminates in a spherical ball extending from a first yoke member, a tubular member extending from a second yoke member and surrounding the spherical ball on said stud, and a plurality of centering shoes disposed between said tubular member and said spherical ball, at least a portion of each centering shoe being in the shape of a right cylindrical tubular segment with an outer radius greater than the radius of the bore of the tubular member whereby said shoes are distorted in their assembled position and are resiliently urged radially inwardly into contact with said spherical ball.

2. Centering means for a universal joint comprising a stud terminating in a spherical ball extending from a first yoke member, a tubular member extending from a second yoke member and surrounding said spherical ball on said stud, and a plurality of centering shoes disposed between said tubular member and said spherical ball, a portion at least of each centering shoe being in the shape of a right cylindrical tubular segment with an outer radius greater than the radius of the bore of the tubular member and an inner radius greater than the radius of the spherical ball whereby said shoes are distorted in their assembled position and are resiliently urged radially inwardly into point contact with said spherical ball.

3. The combination as described in claim 2 wherein the difference between the inner radius of the tubular segments and the radius of the spherical ball is greater than the difference between the outer radius of the tubular segments and the radius of the bore of the tubular member.

4. Centering means for a universal joint comprising a stud extending from a first yoke member, a spherical ball on the end of said stud disposed in a tubular member extending from a second yoke member, a plurality of centering shoes disposed in said tubular member and seating said spherical ball, each centering shoe having a partispherical cavity portion contiguous with the inner surface of a right cylindrical tubular segment which has an outer radius greater than the radius of the bore of the tubular member and an inner radius greater than the radius of the spherical ball.

5. The combination as described in claim 4 wherein the partispherical cavity portions of the centering shoes have a portion removed therefrom by a projected axial groove to proportion the wear thereof to that of the cylindrical surfaces.

6. Centering means for a universal joint comprising a stud extending from a first yoke member and terminating in a spherical ball, a tubular member extending from a second yoke member and surrounding said ball end of said stud; three centering shoes disposed within said tubular member and seating said spherical ball, and spring means disposed in said tubular member between an end wall thereof and said centering shoes biasing the centering shoes toward said spherical ball; each centering shoe having a partispherical cavity portion contiguous with the inner surface of a right cylindrical tubular segment which has an outer radius greater than the radius of the bore of the tubular member and an inner radius greater than the radius of the spherical ball.

7. The combination as described in claim 6 wherein the difference between the inner radius of the tubular segments and the radius of the spherical ball is greater than the difference between the outer radius of the tubular segments and the radius of the bore of the tubular member.

8. The combination as described in claim 6 wherein the difference between the inner radius of the tubular segments and the radius of the spherical ball is from 110% to 150% of the difference between the outer radius of the tubular segments and the radius of the bore of the tubular member.

References Cited by the Examiner

UNITED STATES PATENTS

| | | | |
|---|---|---|---|
| 2,947,158 | 8/1960 | King | 64—21 |
| 2,953,001 | 9/1960 | Hufstader | 64—17 |
| 2,991,634 | 7/1961 | Dailey | 64—21 |
| 3,029,618 | 4/1962 | Bouchard | 64—21 |
| 3,215,480 | 11/1965 | Marley | 308—121 |

FRED C. MATTERN, JR., *Primary Examiner.*

HALL C. COE, *Examiner.*